United States Patent
Prasad et al.

(10) Patent No.: US 12,086,542 B2
(45) Date of Patent: Sep. 10, 2024

(54) SYSTEM AND METHOD FOR GENERATING CONTEXTUALIZED TEXT USING A CHARACTER-BASED CONVOLUTIONAL NEURAL NETWORK ARCHITECTURE

(71) Applicant: TALENT UNLIMITED ONLINE SERVICES PRIVATE LIMITED, Delhi (IN)

(72) Inventors: Rahul Prasad, Gurugram (IN); Ankit Prasad, Gurugram (IN); Sumegha Yadav, Gurugram (IN)

(73) Assignee: TALENT UNLIMITED ONLINE SERVICES PRIVATE LIMITED (IN)

( * ) Notice: Subject to any disclaimer, the term of this patent is extended or adjusted under 35 U.S.C. 154(b) by 342 days.

(21) Appl. No.: 17/714,952

(22) Filed: Apr. 6, 2022

(65) Prior Publication Data
US 2022/0318500 A1 Oct. 6, 2022

(30) Foreign Application Priority Data
Apr. 6, 2021 (IN) .............................. 202111016183

(51) Int. Cl.
*G06F 40/274* (2020.01)
*G06F 3/0481* (2022.01)
(Continued)

(52) U.S. Cl.
CPC .......... *G06F 40/274* (2020.01); *G06F 3/0481* (2013.01); *G06F 3/0484* (2013.01);
(Continued)

(58) Field of Classification Search
CPC .... G06F 40/274; G06F 3/0481; G06F 3/0484; G06F 40/284; G06F 40/30; G06N 3/08; G06N 3/045; G06N 3/0464; G06N 3/0895
(Continued)

(56) References Cited

U.S. PATENT DOCUMENTS

| | | | |
|---|---|---|---|
| 6,848,080 B1 * | 1/2005 | Lee .......................... | G06F 40/53 704/9 |
| 7,165,019 B1 * | 1/2007 | Lee ........................ | G06F 40/232 704/8 |

(Continued)

*Primary Examiner* — Thuykhanh Le
(74) *Attorney, Agent, or Firm* — Joy S. Goudie; GOUDIE,PLLC

(57) ABSTRACT

A system for generating a contextualized text using a character-based convolutional neural network architecture (CNN) is disclosed. The system includes a memory, a character-based CNN engine having executable modules and a processor configured to execute the character-based CNN engine and the executable modules for generating contextualized text using a character-based convolutional neural network architecture (CNN). The executable modules includes a data processing module for pre-processing an input conversational text data, a corpus builder unit for developing a corpus of most frequent n-grams, a dataset generation module for performing logarithmic mapping of a frequency of a respective n-gram in the corpus for a dataset prepared for training, a training module for training an artificial intelligence (AI) based model with datasets for a predetermined range of epochs and a prediction module for executing the trained AI-based model for predicting characters contextually till an end-of-sentence (EOS) token is found.

16 Claims, 9 Drawing Sheets

(51) Int. Cl.
   *G06F 3/0484*   (2022.01)
   *G06F 40/284*   (2020.01)
   *G06F 40/30*    (2020.01)
   *G06N 3/08*     (2023.01)

(52) U.S. Cl.
   CPC ............ *G06F 40/284* (2020.01); *G06F 40/30* (2020.01); *G06N 3/08* (2013.01)

(58) Field of Classification Search
   USPC .............................................................. 704/9
   See application file for complete search history.

(56) References Cited

U.S. PATENT DOCUMENTS

| | | | | |
|---|---|---|---|---|
| 7,275,029 B1* | 9/2007 | Gao | ................ | G06F 40/44 704/10 |
| 7,478,033 B2* | 1/2009 | Wu | ................ | G06F 40/129 704/10 |
| 7,917,355 B2* | 3/2011 | Wu | ................ | G06F 40/242 704/10 |
| 7,983,902 B2* | 7/2011 | Wu | ................ | G06F 40/258 704/10 |
| 8,195,448 B2* | 6/2012 | Dargan | ................ | G06F 3/0237 704/4 |
| 8,370,125 B2* | 2/2013 | Fux | ................ | G06F 3/0237 455/566 |
| 8,370,143 B1* | 2/2013 | Coker | ................ | G06F 40/274 704/240 |
| 8,825,474 B1* | 9/2014 | Zhai | ................ | G06F 40/237 704/4 |
| 8,938,384 B2* | 1/2015 | Goswami | ................ | G06F 40/263 704/8 |
| 11,526,756 B1* | 12/2022 | Arici | ................ | G06N 3/045 |
| 11,694,029 B2* | 7/2023 | Malak | ................ | G06F 16/353 704/9 |
| 2007/0074131 A1* | 3/2007 | Assadollahi | ................ | G06F 40/242 715/236 |
| 2008/0195571 A1* | 8/2008 | Furuuchi | ................ | G06F 40/274 706/56 |
| 2009/0058861 A1* | 3/2009 | Ihara | ................ | G06F 3/0236 345/467 |
| 2009/0112578 A1* | 4/2009 | Fux | ................ | G06F 3/0237 704/E11.001 |
| 2009/0193334 A1* | 7/2009 | Assadollahi | ................ | G06F 40/274 707/999.005 |
| 2010/0161313 A1* | 6/2010 | Karttunen | ................ | G06F 40/289 704/9 |
| 2011/0131035 A1* | 6/2011 | Fux | ................ | G06F 1/1662 704/E11.001 |
| 2011/0196671 A1* | 8/2011 | Fux | ................ | G06F 1/1626 704/9 |
| 2011/0288856 A1* | 11/2011 | Fux | ................ | G06F 1/1626 704/9 |
| 2012/0022858 A1* | 1/2012 | Fux | ................ | G06F 3/0237 704/9 |
| 2012/0029910 A1* | 2/2012 | Medlock | ................ | G06F 40/274 704/9 |
| 2012/0041757 A1* | 2/2012 | Fux | ................ | G06F 3/0237 704/9 |
| 2013/0013292 A1* | 1/2013 | Fux | ................ | G06F 3/0237 704/9 |
| 2013/0253912 A1* | 9/2013 | Medlock | ................ | G06F 40/205 704/9 |
| 2013/0289979 A1* | 10/2013 | Fux | ................ | G06F 3/0233 704/9 |
| 2013/0339004 A1* | 12/2013 | Fux | ................ | G06F 40/274 704/9 |
| 2014/0201671 A1* | 7/2014 | Zhai | ................ | G06F 40/284 715/773 |
| 2014/0297267 A1* | 10/2014 | Spencer | ................ | G06F 3/04886 704/9 |
| 2014/0310639 A1* | 10/2014 | Zhai | ................ | G06F 3/0484 715/780 |
| 2014/0351741 A1* | 11/2014 | Medlock | ................ | G06F 3/04886 704/9 |
| 2014/0351760 A1* | 11/2014 | Skory | ................ | G06F 3/04883 715/830 |
| 2015/0193431 A1* | 7/2015 | Stoytchev | ................ | G16B 20/20 704/9 |
| 2015/0347381 A1* | 12/2015 | Bellegarda | ................ | G06F 40/274 704/9 |
| 2015/0347383 A1* | 12/2015 | Willmore | ................ | G06F 40/274 704/9 |
| 2017/0185566 A1* | 6/2017 | Nicholas | ................ | G06F 40/143 |
| 2017/0270092 A1* | 9/2017 | He | ................ | G06F 3/0482 |
| 2021/0271364 A1* | 9/2021 | Ghassabian | ................ | G06F 3/0237 |
| 2022/0215172 A1* | 7/2022 | Yoo | ................ | G06F 3/04842 |
| 2022/0284191 A1* | 9/2022 | Qiu | ................ | G06F 40/295 |
| 2023/0342551 A1* | 10/2023 | Eberle | ................ | G06F 40/216 |

\* cited by examiner

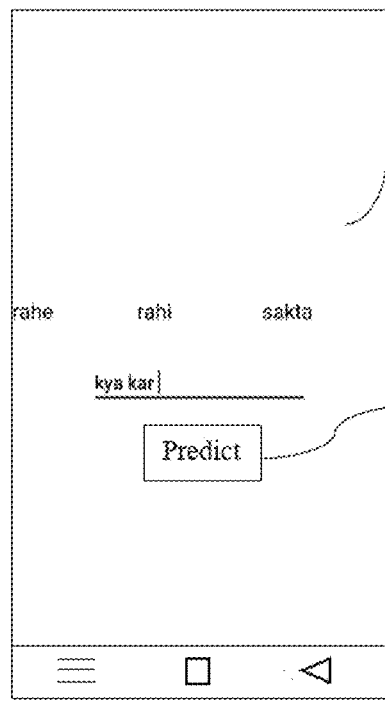 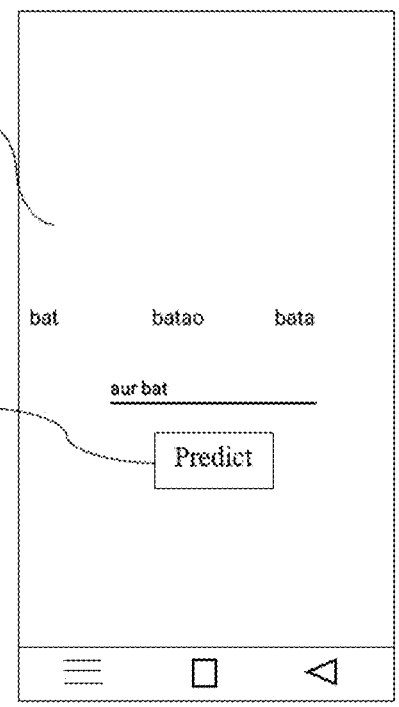
FIG. 5B    FIG. 5C
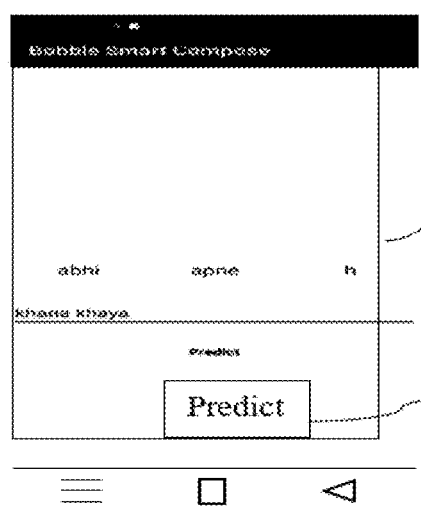 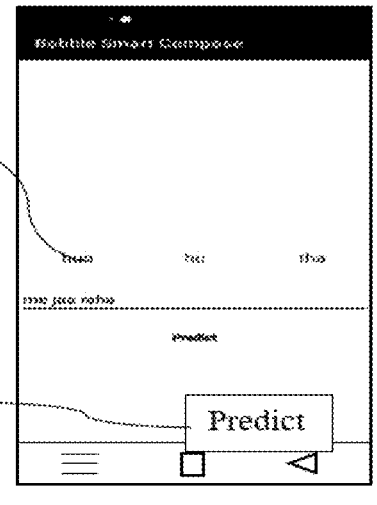
FIG. 5D    FIG. 5E

SYSTEM AND METHOD FOR GENERATING CONTEXTUALIZED TEXT USING A CHARACTER-BASED CONVOLUTIONAL NEURAL NETWORK ARCHITECTURE

CROSS-REFERENCE TO RELATED APPLICATIONS

This application claims priority to and the benefit of the non-provisional patent application titled "System And Method For Generating Contextualized Text Using A Character-Based Convolutional Neural Network Architecture", application number 202111016183, filed in the Indian Patent Office on Apr. 6, 2021. The specification of the above referenced patent application is incorporated herein by reference in its entirety.

BACKGROUND

Technical Field

The present invention, in general, relates to natural language text generation. More particularly, the present invention relates to a system and a method for generating contextualized text using a character-based convolutional neural network (CNN) architecture.

Description of the Related Art

Natural language processing (NLP) has gained substantial significance in recent years. NLP involves development of computational algorithms for automatically analyzing, interpreting, and representing natural languages. Recent trends in NLP have shown an extensive use of deep learning models for various applications such as language modeling or text generation that involves a computation of words when a sequence of words is fed as input. For example, NLP uses an N-grams model and a recurrent neural network (RNN) architecture such as long short-term memory (LSTM) for generating suggestions or predictions for the next word after a text input is received from a user on a user interface of a user device such as a mobile device. Keyboard applications deployed on mobile devices typically provide suggestions or predictions using a coupled input and forget gate (CIFG) LSTM. LSTM networks require a substantial number of resources and time to get trained and become ready for real-world applications. Moreover, an RNN or LSTM-based architecture produces substantial latency and lag when deployed on resource-scarce and edge devices such as mobile devices. The LSTM networks need high memory-bandwidth due to the number of linear layers present in each cell, which most systems typically fail to provide, thereby reducing efficiency of the LSTM networks from a hardware perspective.

Artificial intelligence (AI) models typically deployed in keyboard applications (apps) on mobile devices for generating next word suggestions or predictions are constrained in multiple ways. To run on both low and high-end mobile devices, the AI models must be small and inference-time latency must be low. Users typically expect a visible keyboard response, for example, within about 20 milliseconds (ms) to about 30 ins of an input event, while a user uses other applications that are draining resources on a mobile device. Given the frequency with which mobile keyboard apps are used, batteries in the mobile devices are typically depleted quickly if central processing unit (CPU) usage consumption is not constrained. There is a need for a light-weight model structure for text generation that provides optimal latency time.

Most state-of-the-art models that offer solutions to sequence-to-sequence type problems are typically word-based and require a vocabulary of allowed words to be maintained always, which treats new words being entered as out-of-vocabulary (OOV), unless these new words are added to the vocabulary, thereby resulting in text recognition errors and improper text generation. Moreover, it is difficult to generate contextualized text for input text entered in macaronic languages that have no well-defined vocabulary, no well-defined sentence structure, no vocabulary rules, no grammar rules, and no sentence structure rules.

Also, although existing tools are proficient at generating reports in easily comprehensible formats, they cannot work by directly deriving insights from unstructured data. The existing systems need to be fed data using structured databases, which means that the process of NLG may not be entirely autonomous and hence, not fully intelligent. There are also where a natural language generation has been helping businesses automate the processes that require the creation of information in natural language. An example is a content creation AI tool that is capable of writing as naturally as humans by building on short, manually provided writing prompts. Such systems, while not capable of perfectly replicating human ways of expression, can definitely put together long and coherent sequences of sentences.

Hence, there is a long-felt need for a system and a method for generating contextualized text using a character-based convolutional neural network (CNN) architecture, while addressing the above-recited problems associated with the related art.

SUMMARY

This summary is provided to introduce a selection of concepts in a simplified form that are further disclosed in the detailed description. This summary is not intended to determine the scope of the claimed subject matter.

The embodiments herein address the above-recited needs for a system and a method for automated mechanism using real data to filter, prioritize and identify impacted work items with highest probability of being broken, which helps teams focus on regressions to occur and will increase time and space for innovation.

In an aspect a system for generating a contextualized text using a character-based convolutional neural network architecture (CNN) is provided. The system includes a memory including a character-based CNN engine including one or more executable modules and a processor configured to execute the character-based CNN engine and one or more executable modules for the generating contextualized text using a character-based convolutional neural network architecture (CNN). The one or more executable modules includes a data processing module for receiving and pre-processing an input conversational text data, a corpus builder unit for developing a corpus of most frequent n-grams, a dataset generation module for performing logarithmic mapping of a frequency of a respective n-gram in the corpus for a dataset prepared for training, a training module for training an artificial intelligence (AI) based model with datasets for a predetermined range of epochs and a prediction module for executing the trained AI-based model for predicting characters contextually till an end-of-sentence (EOS) token is found. The character-based CNN engine develops the artificial intelligence (AI)-based model for generating characters that make contextually related words using a character-based CNN architecture.

In an embodiment the character-based CNN engine is further configured to prepare a one-character shifting dataset for each n-gram in the corpus that is logarithmically mapped.

In an embodiment the character-based CNN engine is further configured to create a mapping of the characters to indices for training data and split the data into train, test, and validation datasets.

In an embodiment the training module is further configured to train the AI-based model using languages includes well-defined vocabulary, grammar rules, and sentence structure rules, In an embodiment the AI-based model is a character-based model that receives a sequence of characters instead of words to overcome out-of-vocabulary errors, learns semantic meaning using sub-word information, and generates contextualized text.

In an embodiment the AI-based model is further configured to interpret words that mean the same but are spelt differently.

In an embodiment the predicting module is further configured for receiving the input of characters from a user via a user interface, sending, by the character-based CNN engine, the input characters to the AI-based model to generate and display suggestions on the user interface, determining, by the character-based CNN engine, whether any of the suggestions is selected by the user and displaying, by the character-based CNN engine, suggestions or predictions till an end-of-sentence token is encountered.

In an embodiment for determining whether any of the suggestions is selected, the character-based CNN engine further performs determining if the user selects one of the suggestions, displaying a subsequent contextualized word predictions generated by the AI-based model, upon the user selecting one of the suggestions and displaying new suggestions generated by the AI-based model to the user based on one or more new characters input by the user, upon the user not selecting one of the suggestions.

In an embodiment the character-based CNN architecture includes a configurable number of convolutional layers. The layers are the input embedding layer, a batch normalization layer, a first convolutional layer and a parametric rectified linear unit (PReLU) layer.

In an embodiment the system includes a hybrid model architecture ingests a character and outputs a word. The model supports complete typing solutions by providing contextualized predictions, suggestions, and auto-corrections.

In another aspect a method for generating contextualized text using a character-based convolutional neural network architecture (CNN) is provided. The method includes receiving, and pre-processing input conversational text data, using a data processing module. The method further includes developing, using a corpus builder unit, a corpus of most frequent n-grams from the input conversational text data. The method further includes performing, using a dataset generation module, a logarithmic mapping of a frequency of a respective n-gram in the corpus for a dataset prepared for training. The method further includes preparing, using a CNN engine, a one-character shifting dataset for each n-gram in the corpus that is logarithmically mapped. The method further includes creating, using the character-based CNN engine, a mapping of the characters to indices for training data and splitting the data into train, test, and validation datasets. The method further includes training, using a training module, the AI-based model with the train, test, and validation datasets for a predetermined range of epochs. The method further includes executing the AI-based model for predicting characters contextually till an end-of-sentence (EOS) token is found. The method further includes performing a continuous generation of words, contextually.

In an embodiment the character-based CNN engine trains the AI-based model using languages that have no well-defined vocabulary, grammar rules, and sentence structure rules.

In an embodiment the character-based CNN engine develops an artificial intelligence (AI)-based model for generating characters that make contextually related words using a character-based CNN architecture.

In an embodiment the AI-based model is a character-based model and is configured to receive a sequence of characters instead of words to overcome out-of-vocabulary errors, learn semantic meaning using sub-word information, and generate a contextualized text.

In an embodiment further includes interpreting words that mean the same but are spelt differently by AI based model.

In an embodiment the predicting further includes receiving the input of characters from a user via a user interface, sending, by the character-based CNN engine, the input characters to the AI-based model to generate and display suggestions on the user interface, determining, by the character-based CNN engine, whether any of the suggestions is selected by the user and displaying, by the character-based CNN engine, suggestions or predictions till an end-of-sentence token is encountered.

In an embodiment for determining whether any of the suggestions is selected, includes determining if the user selects one of the suggestions, displaying a subsequent contextualized word predictions generated by the AI-based model, upon the user selecting one of the suggestions and displaying new suggestions generated by the AI-based model to the user based on one or more new characters input by the user, upon the user not selecting one of the suggestions.

In an embodiment the character-based CNN architecture includes a configurable number of convolutional layers. The layers are the input embedding layer, a batch normalization layer, a first convolutional layer and a parametric rectified linear unit (PReLU) layer.

In an embodiment the method further includes ingesting a character and outputs a word. The model supports complete typing solutions by providing contextualized predictions, suggestions, and auto-corrections.

In one or more embodiments, related systems comprise circuitry and/or programming for executing the methods disclosed herein. The circuitry and/or programming are of any combination of hardware, software, and/or firmware configured to execute the methods disclosed herein depending upon the design choices of a system designer. In an embodiment, various structural elements are employed depending on the design choices of the system designer.

BRIEF DESCRIPTION OF THE DRAWINGS

The embodiments herein will be better understood from the following detailed description with reference to the drawings, in which:

The foregoing summary, as well as the following detailed description, is better understood when read in conjunction with the appended drawings. For illustrating the present invention, exemplary constructions of the present invention are shown in the drawings. However, the present invention is not limited to the specific methods and components disclosed herein. The description of a method step or a component referenced by a numeral in a drawing is applicable to the description of that method step or component shown by that same numeral in any subsequent drawing herein.

FIGS. 5A-5E exemplarily illustrate user interfaces displaying contextualized text in the form of suggestions or predictions generated using a character-based CNN engine, according to an embodiment of the present invention;

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments disclosed herein provide methods and systems for generating contextualized text using a character-based convolutional Neural Network (CNN) Architecture. The present technology is capable of generating characters that make words which are contextually related. Such kind of architecture can be used widely in natural language generation, a field which has many applications like analytics dashboards, chatbots, content creation and the like. The present technology can be applied in natural language generation for writing meeting memos, press releases, legal documents, case studies, financial reports, weather reports, product descriptions, and handling of complex customer communication. The present technology reduces human involvement and allows deployment of resources efficiently. The present technology can also be applied in natural language generation for inventory management and implementation as a comprehensive.

Figure 1:
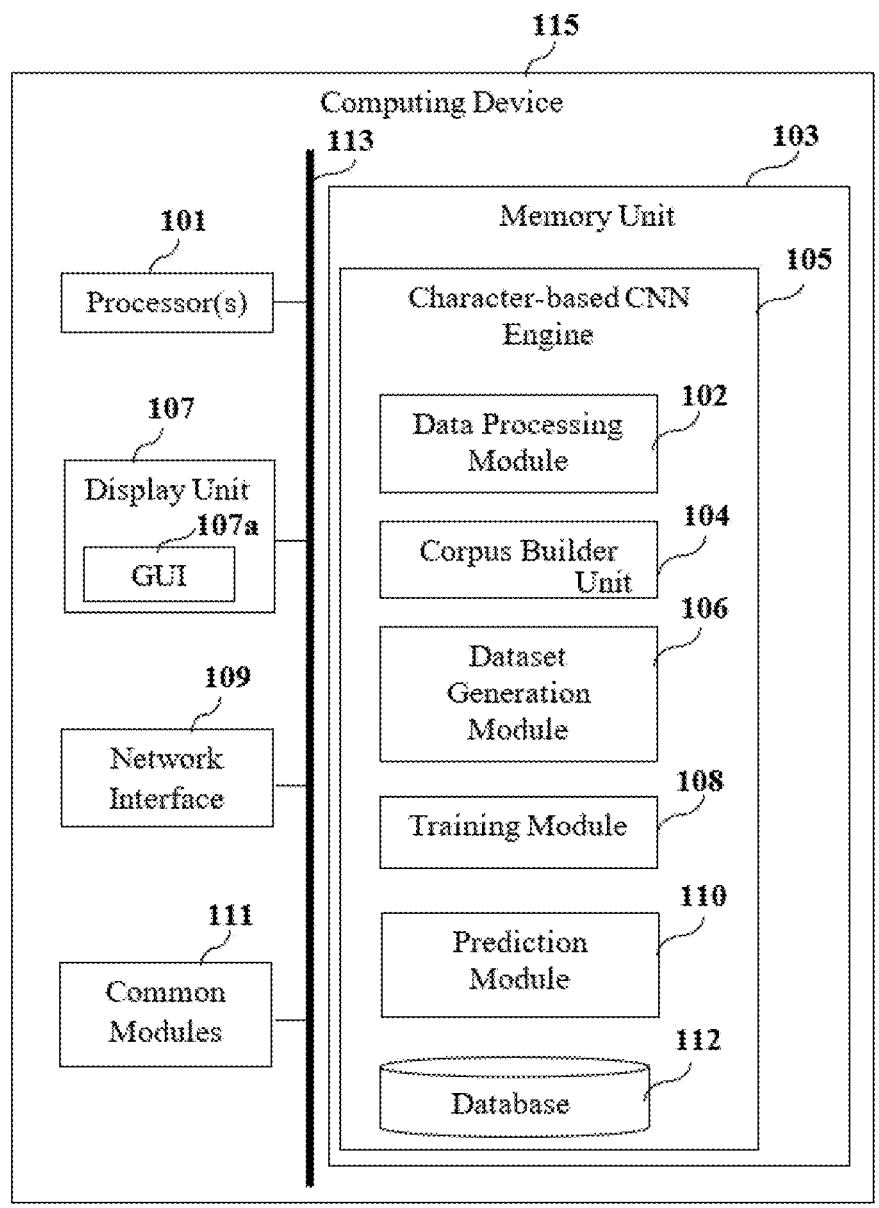
FIG. 1 illustrates an architectural block diagram of a system for generating contextualized text using a character-based CNN architecture, according to an embodiment of the present invention.

FIG. 1 illustrates an architectural block diagram of a system for generating contextualized text using a character-based convolutional neural network (CNN) architecture, according to an embodiment of the present invention. The system 100 comprises at least one processor 101 and a non-transitory, computer-readable storage medium, for example, a memory unit 103, for storing computer program instructions defined by modules of character-based convolutional neural network (CNN) engine 105. In an embodiment, the modules of the character-based CNN engine 105 are stored in the memory unit 103. The processor 101 is operably and communicatively coupled to the memory unit 103 for executing the computer program instructions defined by the modules of the character-based CNN engine 105. The processor 101 refers to any one or more microprocessors, central processing unit (CPU) devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. The character-based CNN engine 105 comprises modules defining computer program instructions, which when executed by the processor 101, cause the processor 101 to generate contextualized text using the character-based CNN architecture. In an embodiment, the modules of the character-based CNN engine 105 comprise a data processing module 102, a corpus builder unit 104, a dataset generation module 106, a training module 108, and a prediction module 110. The processor 101 is operably and communicatively coupled to the memory unit 103 for executing the computer program instructions defined by the modules, for example, 102-110 of the character-based CNN engine 105.

The system 100 comprises a data bus 113, a display unit 107, a network interface 109, and common modules 111. The data bus 114 permits communications between the modules, for example, 102-108. The display unit 107, via a graphical user interface (GUI) 107a, displays information, display interfaces, user interface elements such as checkboxes, input text fields, etc., for example, for allowing a user to invoke and execute the character-based CNN engine 105, input data for text generation, and perform input actions for triggering various functions required for contextualized text generation.

The network interface 109 enables connection of the character-based CNN engine 105 to the network. The network interface 109 is, for example, one or more of infrared interfaces, interfaces implementing Wi-Fi® of Wi-Fi Alliance Corporation, universal serial bus interfaces. FireWire® interfaces of Apple Inc., interfaces based on transmission control protocol/internet protocol, interfaces based on wireless communications technology such as satellite technology, radio frequency technology, near field communication, etc. The common modules 111 of the system 100 comprise, for example, input/output (I/O) controllers, input devices, output devices, fixed media drives such as hard drives, removable media drives for receiving removable media, and the like. The computer applications and programs are used for operating the character-based CNN engine 105. The programs are loaded onto fixed media drives and into the memory 103 via the removable media drives. In an embodiment, the computer applications and programs are loaded into the memory 103 directly via the network. The character-based CNN engine 105 is configures to prepare a one character shifting dataset for each n-gram in the corpus that is logarithmically mapped. The character-based CNN engine 105 is further configured to create a mapping of the characters to the indices for training data and split the data into train, test, and validation datasets.

In an embodiment, the data processing module 102 receives and pre-processes input conversational text data, for example, by removing special characters, emojis, etc., and masking numbers contained in the input conversational text data. The corpus builder unit 104 develops a corpus of most frequent n-grams, for example, 5-grams, using text of character length 25. The dataset generation module 106 performs logarithmic mapping of a frequency of a respective n-gram in the corpus for a dataset prepared for training. The dataset generation module 106 prepares a one-character shifting dataset for each n-gram in the corpus that is logarithmically mapped. The dataset generation module 106 creates a mapping of the characters to indices for training data and splits the data into train, test, and validation datasets. The training module 108 trains the AI-based model with the datasets for a predetermined range of epochs, for example, 500-600 epochs, by fine tuning hyperparameters. The training module 108 is further configured to train the AI based model using languages comprising well defined vocabulary, grammar rules and sentence structure rules. The prediction module 110 executes the trained AI-based model for predicting characters contextually till an end-of-sentence (EOS) token is found. The prediction module 110 is configured to receive the input of characters from a user via a user interface, send the input characters to the AI-based model to generate and display suggestions on the user interface, determining, whether any of the suggestions is selected by the user, and displaying, suggestions or predictions till an end-of-sentence token is encountered. For determining whether any of the suggestions is selected, the character-based CNN engine further performs determining if the user selects one of the suggestions, displaying a subsequent contextualized word predictions generated by the AI-based model, upon the user selecting one of the suggestions, and displaying new suggestions generated by the AI-based model to the user based on one or more new characters input by the user, upon the user not selecting one of the suggestions. The character-based CNN architecture utilizes the convolutional layers with convolving filters, also referred to as "feature detectors" or "kernels," that are applied to the input text. The character-based CNN architecture mimics or replicates the behavior of a recurrent neural network (RNN) such as a long short-term memory (LSTM) network used for language modelling or text generation.

The character-based CNN engine, herein referred to as the "CNN engine," develops an artificial intelligence (AI)-based model configured to generate characters that make words that are contextually related, using the character-based CNN architecture. The character-based CNN engine 105 receives input conversational text data. The character-based CNN engine 105 pre-processes the input conversational text data, for example, by removing special characters, emojis, etc., and masking numbers contained in the input conversational text data. The character-based CNN engine 105 develops a corpus of most frequent n-grams, for example, 5-grams, using text of character length 25. The character-based CNN engine 105 performs a logarithmic mapping of a frequency of a respective n-gram in the corpus for a dataset prepared for training. The character-based CNN engine 105 prepares a one-character shifting dataset for each n-gram in the corpus that is logarithmically mapped. The character-based CNN engine 105 creates a mapping of the characters to indices for training data and splits the data into train, test, and validation datasets. The character-based CNN engine 105 trains the AI-based model with the datasets for a predetermined range of epochs, for example, 500-600 epochs, by fine tuning hyperparameters. The character-based CNN engine 105 executes the AI-based model for predicting 108 characters contextually till an end-of-sentence (EOS) token is found. The character-based CNN engine 105, therefore, performs a continuous generation of words, contextually.

The AI-based model mimics the structure of an RNN-based model and generates text in a continuous manner until an end-of-sentence (EOS) token is found. The AI-based model is a character-based model that receives a sequence of characters instead of words to overcome out-of-vocabulary (OOV) errors, learns semantic meaning using sub-word information, and generates contextualized text. The AI-based model contains a vocabulary of the number of characters in a language being used. For example, the AI-based model contains a vocabulary of 26 characters of the English language. In an embodiment, the AI-based model contains additional characters, for example, ";" ".", "!", "?", etc., configured during development of the AI-based model. The reduced vocabulary makes the AI-based model lightweight without any dependency on dictionary maintenance. The AI-based model is also configured to handle OOV tokens and generate an output for similar and near vectors found in the input token.

In an embodiment, the character-based CNN engine 105 trains the AI-based model using languages that have no well-defined vocabulary, or grammar rules, or sentence structure rules, for example, macaronic languages such as Hinglish, which is written using Latin or English characters. The AI-based model interprets the context of a macaronic language and provides suggestions or predictions accordingly.

Figure 2:
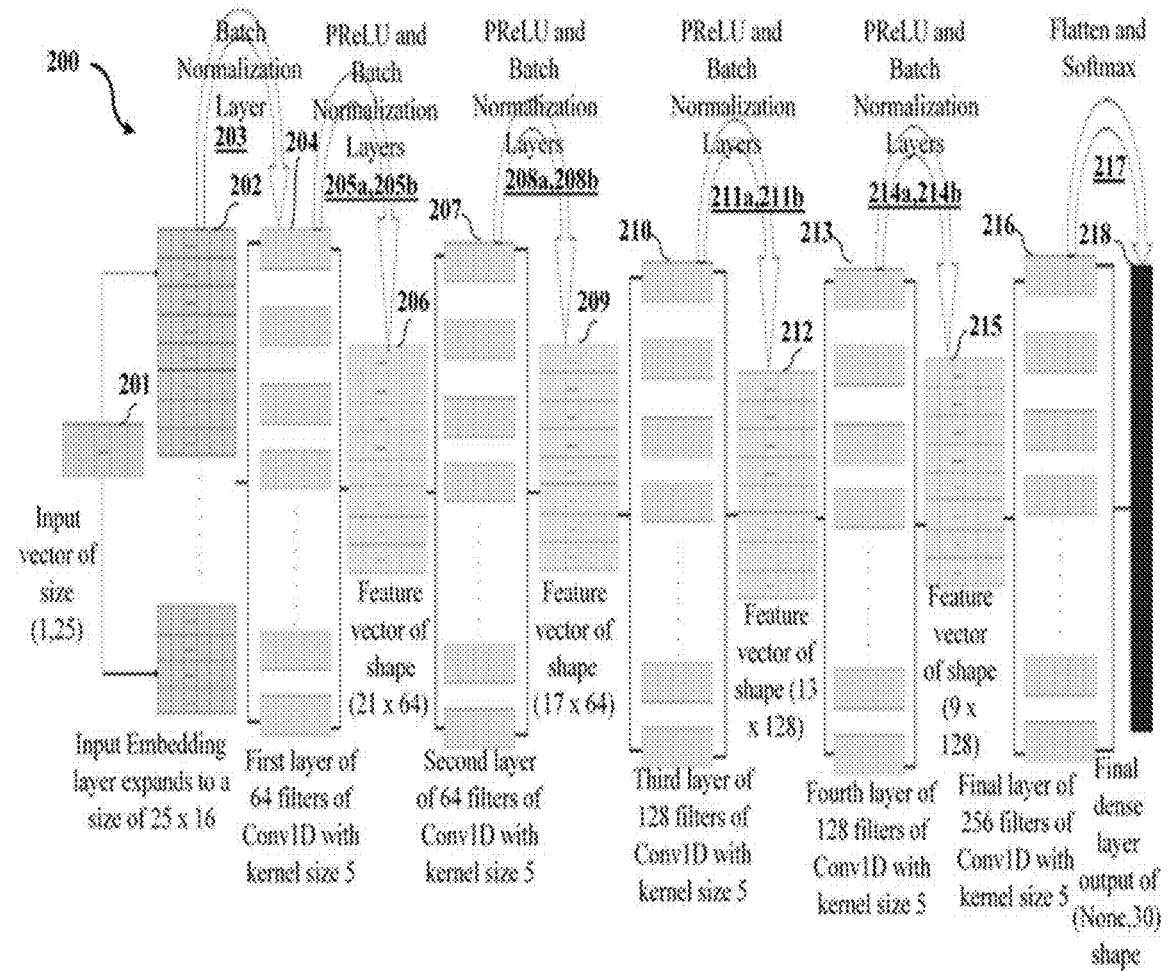
FIG. 2 illustrates a block diagram of the character-based CNN architecture, according to an embodiment of the present invention.

FIG. 2 illustrates a block diagram of the character-based CNN architecture 200, according to an embodiment of the present invention. In an exemplary implementation, the character-based CNN architecture 200 comprises a configurable number of convolutional layers, for example, five convolutional layers 204, 207, 210, 213, and 216 of one-dimensional convolution (Conv1D) of a fixed kernel size and a variable number of filters as exemplarily illustrated in FIG. 2. In this embodiment, the stacking of the filters of each of the convolutional layers 204, 207, 210, 213, and 216 in the character-based CNN architecture 200 is serialized similar to the stacking of filters in a recurrent neural network (RNN)-based architecture. All the filters in each of the convolutional layers 204, 207, 210, 213, and 216 are fed the same input at the same time. The filters generate feature maps, which are consecutively fed to other layers and finally to a dense layer that dictates the text generation. In an exemplary implementation as illustrated in FIG. 2, the character-based CNN architecture 200 comprises an input embedding layer 202 and the five convolutional layers 204, 207, 210, 213, and 216. Each of the convolutional layers 204, 207, 210, 213, and 216 comprises filters stacked one over the other. Furthermore, the output of one convolutional layer is cascaded as an input to another convolutional layer.

In the exemplary implementation illustrated in FIG. 2, the input embedding layer 202 receives input text with a maximum length of 25 characters in the form of an input vector 201 of size (1,25). The input embedding layer 202 expands the input vector 201 to a size of 25×16 where "25" is the maximum length of the input text allowed and "16" is an embedding dimension used for character embedding. A batch normalization layer 203 receives the expanded input vector 201 from the input embedding layer 202 and executes batch normalization on the expanded input vector 201. The first convolutional layer 204 comprises 64 filters of Conv1D with a kernel size of 5. The first convolutional layer 204 receives the batch normalized vector and performs a one-dimensional convolution on the batch normalized vector. That is, each of the 64 filters of the first convolutional layer 204 receives the batch normalized vector at the same time and the 64 filters in the first convolutional layer 204 generate a feature map. The first convolutional layer 204 passes the feature map through a cascading of a parametric rectified linear unit (PReLU) layer 205a and a batch normalization layer 205b. The PReLU layer 205a executes an activation function on the convolved feature map to generate a feature vector 206 of shape 21×64. The batch normalization layer 205b receives the feature vector 206 from the PReLU layer 205a and executes batch normalization on the feature vector 206.

The character-based CNN engine inputs the feature vector 206 to the second convolutional layer 207 comprising 64 filters of Conv1D with a kernel size of 5. The second convolutional layer 207 receives the batch normalized feature vector 206 and performs a one-dimensional convolution on the batch normalized feature vector 206 as disclosed above to generate a convolved feature map. The second convolutional layer 207 passes the feature map through a cascading of a PReLU layer 208a and a batch normalization layer 208b. The PReLU layer 208a executes an activation function on the convolved feature map to generate a feature vector 209 of shape 17×64. The batch normalization layer 208b receives the feature vector 209 from the PReLU layer 208a and executes batch normalization on the feature vector 209.

The character-based CNN engine inputs the feature vector 209 to the third convolutional layer 210 comprising 128 filters of Conv1D with a kernel size of 5. The third convolutional layer 210 receives the batch normalized vector 209 and performs a one-dimensional convolution on the batch normalized vector 209 as disclosed above to generate a convolved feature map. The third convolutional layer 210 passes the feature map through a cascading of a PReLU layer 211a and a batch normalization layer 211b. The PReLU layer 211a executes an activation function on the convolved feature map to generate a feature vector 212 of shape 13×128. The batch normalization layer 211b receives the feature vector 212 from the PReLU layer 211a and executes batch normalization on the feature vector 212. The character-based CNN engine inputs the feature vector 212 to the fourth convolutional layer 213 comprising 128 filters of Conv1D with a kernel size of 5. The fourth convolutional layer 213 receives the batch normalized feature vector 212 and performs a one-dimensional convolution on the batch normalized feature vector 212 as disclosed above to generate a convolved feature map. The fourth convolutional layer 213 passes the feature map through a cascading of a PReLU layer 214a and a batch normalization layer 214b. The PReLU layer 214a executes an activation function on the convolved feature map to generate a feature vector 215 of shape 9×128. The batch normalization layer 214b receives the feature vector 215 from the PReLU layer 214a and executes batch normalization on the feature vector 215.

The character-based CNN engine inputs the feature vector 215 to the fifth convolutional layer 216 comprising 256 filters of Conv1D with a kernel size of 5. The fifth convolutional layer 216 receives the batch normalized feature vector 215 and performs a one-dimensional convolution on the batch normalized feature vector 215 as disclosed above to generate a convolved feature map. The character-based CNN engine executes flattening and a SoftMax function 217 on the convolved feature map to generate a final dense layer output 218.

In an embodiment, the character-based CNN engine executes a combination of a dense layer once with a hyperbolic tangent (tanh) function and once with a SoftMax function in the character-based CNN architecture 200. The dense layer has the final probabilities of the characters over which prediction is performed. The artificial intelligence (AI)-based model developed using the character-based CNN architecture 200 continuously generates contextual characters on every hit till an end-of-sentence (EOS) token is found. For text generation, the character-based CNN engine configures the dense layer to manage the output such that as a user types a character, suggestions for completing the word are displayed on a user interface of a user device, and correspondingly the contextualized next word predictions are displayed on the user interface. In an exemplary implementation, the combination of the dense layer with a tanh function and with a softmax function in the character-based CNN architecture 200 is disclosed below:

$$out1 = Dense(x, activation = \text{'tanh'})(I0)$$

$$out\_final = Dense(y, activation = \text{'softmax'})(out1)$$

where "x" is a dimension of embedding and "y" is a dimension of vocabulary size. The first dense layer uses a "tanh" activation and the second, final dense layer uses an activation function, that is, the softmax function.

In various embodiments, changes are configured in the AI-based model for increasing robustness and efficiency of the AI-based model. In an embodiment, the character-based CNN engine develops a structure of a character input and a word output type model for generating improved results. In another embodiment, the character-based CNN engine configures the convolution layers to be denser. In another embodiment, instead of cascading, the character-based CNN engine feeds the data into the AI-based model parallelly to allow the AI-based model to understand the intricacies of a language.

Figure 3:
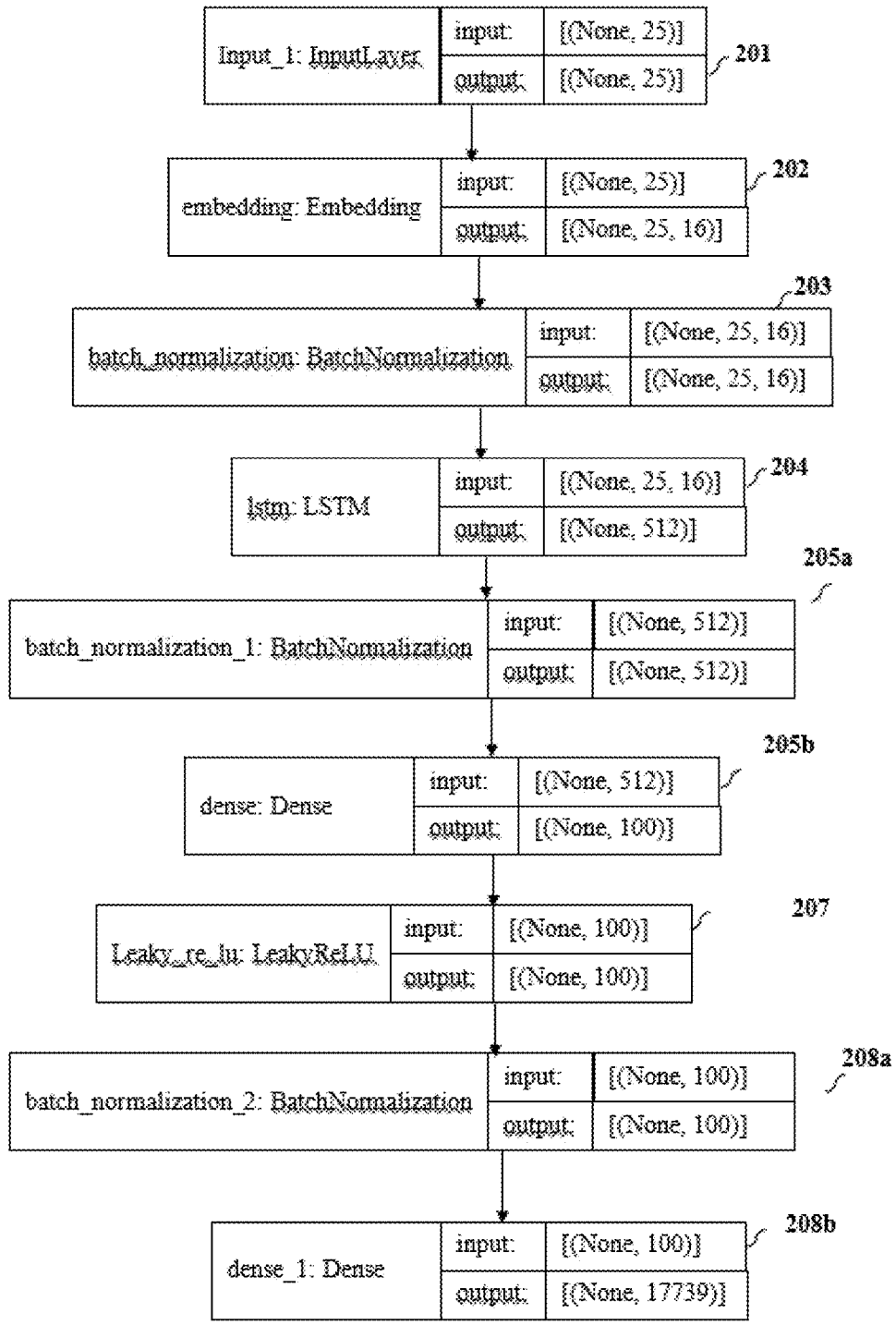
FIG. 3 illustrates a flow diagram showing execution of layers of the character-based CNN architecture for generating contextualized text, according to an embodiment of the present invention.

FIG. 3 illustrates a flow diagram showing execution of layers of the character-based CNN architecture, for generating contextualized text, according to an embodiment of the present invention. FIG. 3 exemplarily illustrate the detailed flow of the layers stacked and the activations used in the AI-based model developed using the character-based CNN architecture 200 exemplarily illustrated in FIG. 2. In an exemplary implementation of the character-based CNN architecture 200, five one-dimensional convolution (Conv1D) layers are stacked with batch normalization layers 203 205b, 208b, and parametric rectified linear unit (PReLU) layers 205a, 208a, as disclosed in the detailed description of FIG. 2. In an embodiment, the character-based CNN architecture 200 is implemented using the Keras framework and a character embedding dimension of 16 using the Keras inbuilt embedding layer. A maximum length of 25 characters is provided as input to the input layer 201. Smaller n-grams are padded with a padding character to equalize the length. The character-based CNN engine processes the feature vectors through the layers as disclosed in the detailed description of FIG. 2. In an embodiment, the character-based CNN engine executes a flatten function 217 on the batch normalized feature vector received from the batch normalization layer 205a, the output of which undergoes a hybrid dense layer 208b, which generates a final output (out_final) as disclosed in the detailed description of FIG. 2. The character-based CNN engine shifts every n-gram character-by-character till the end-of-sentence (EOS) is reached.

Consider an example where the character-based CNN engine captures the most frequent n-grams, where "n" is empirically selected as 5. In experiments, "n" is variable, for example, from 2 to 8. The character-based CNN engine maps the frequency of the respective n-gram to manage the data imbalance. The character-based CNN engine character shifts every data input point. Consider the following training dataset:
sentence=good morning have a nice day
{'g': 'o',
'go': 'o',
'goo': 'd',
'good': ' ',
'good': 'm',
'good m': 'o',
'good mo': 'r',
'good mor': 'n',
'good morn': 'i',
'good morni': 'n',
'good mornin': 'g',
'good morning': ' ',
'good morning': 'h',
'good morning h': 'a',
'good morning ha': 'v',
'good morning hay': 'e',
'good morning have': ' ',
'good morning have': 'a',
'good morning have a': ' ',
'good morning have a': 'n',
'good morning have a n': 'i',
'good morning have a ni': 'c',
'good morning have a nic': 'e',
'good morning have a nice': ' ',
'good morning have a nice': 'd',
'ood morning have a nice d': 'a',
'od morning have a nice da': 'y',
'd morning have a nice day': ' '}

The example above illustrates that with every character shift, the AI-based model developed using the character-based CNN architecture 200 is configured to understand the pattern of characters. Character shifting is useful as the AI-based model learns the character patterns such that even if the user makes a typographical error, for example, if a user types "hello," the character-based CNN engine corrects the typographical error to "hello" as the character-based CNN engine has analyzed the nearest vector of this typographical error variant. Such types of character-shifted datasets for every n-gram displayed are prepared in the method disclosed herein. The character-based CNN engine learns to understand the character patterns being followed while a user types a word or the word's variant so that context does not substantially change.

Figure 4:
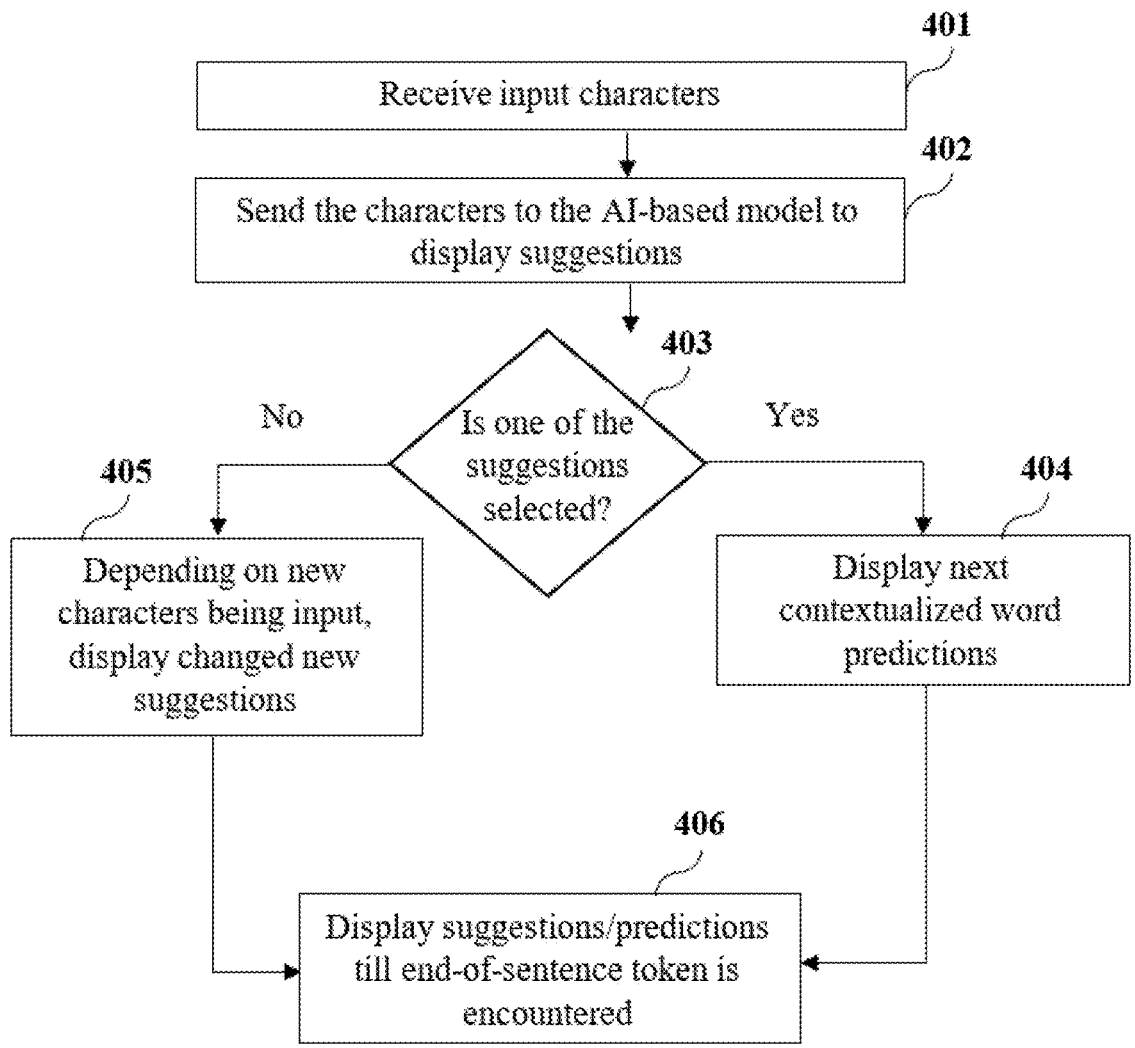
FIG. 4 illustrates a flowchart comprising steps of the method for generating and displaying contextualized text in the form of suggestions or predictions using the character-based CNN architecture, according to an embodiment of the present invention.
Figure 5A:
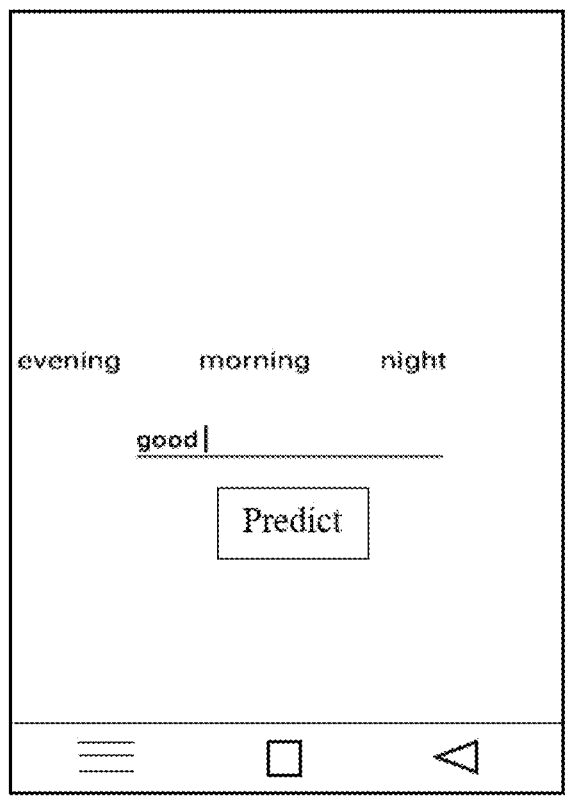

FIG. 4 illustrates a flowchart comprising steps of the method for generating and displaying contextualized text in the form of suggestions or predictions using the character-based CNN architecture, according to an embodiment of the present invention. Consider an example where the character-based CNN engine that implements the AI-based model developed using the character-based CNN architecture illustrated in FIG. 2, is deployed on a user device such as a mobile device. When a user inputs characters into a user interface, for example, a keyboard application, on the mobile device, the character-based CNN engine receives 401 the input characters. The character-based CNN engine sends 402 the input characters to the AI-based model to generate and display suggestions on the user interface. The character-based CNN engine determines 403 whether one of the suggestions is selected by the user. If the user selects one of the displayed suggestions, then the character-based CNN engine displays 404 the next contextualized word predictions generated by the AI-based model. If the user does not select one of the displayed suggestions, then depending on the new characters being input by the user, the character-based CNN engine displays 405 changed new suggestions generated by the AI-based model. The character-based CNN engine displays 406 suggestions or predictions till an end-of-sentence token is encountered.

In text generation, the input is a real-time entity, where the user enters some characters as input and the AI-based model generates a word or words depending on the context formed. The user may or may not select the rendered suggestions. If the user does not select the rendered suggestions and starts entering other characters, the AI-based model ingests the currently typed characters and then changes the predictions to form a better context. This process of text generation is entirely dynamic as opposed to text classification where when one static input is provided, a label is generated for the input.

FIGS. 5A-5E exemplarily illustrate user interfaces 501 displaying contextualized text in the form of suggestions or predictions generated using the character-based CNN engine, according to an embodiment of the present invention. Consider an example where a user starts typing some characters on a user interface 501 of a mobile device, and according to the input, at a character length of 2, the user clicks on an interface element such as a "Predict" button 502 to obtain suggestions. When the user clicks the "Predict" button 502, the character-based CNN engine deployed in the mobile device activates the trained AI-based model to generate suggestions. Once the user enters a "space" on the user interface 501, the character-based CNN engine displays contextualized predictions generated by the AI-based model. If the user selects any one of the contextualized predictions, the character-based CNN engine displays the next word suggestions. If the user does not select any one of the contextualized predictions and starts typing new characters, the character-based CNN engine displays new suggestions based on the current characters being input. In an example, when a user types the word "good" on the user interface 501 of a mobile device and clicks on the "Predict" button 502, the character-based CNN engine deployed in the mobile device activates the trained AI-based model to generate suggestions such as "evening", "morning", and "night". Once the user enters a "space" on the user interface 501, the character-based CNN engine displays the contextualized predictions generated by the AI-based model on the user interface 501 as exemplarily illustrated in FIG. 5A.

In the embodiment, the character-based CNN engine generates character-based models for macaronic languages where the language structure has no well-defined vocabulary, no well-defined sentence structure, no vocabulary rules, no grammar rules, and no sentence structure rules. The character-based CNN engine generates an AI-based model configured to understand the context of a macaronic language and generate suggestions and predictions accordingly. The character-based CNN engine trains the AI-based model on text written in a macaronic language, for example, Hinglish, that is, the Hindi language with a Devanagari script written using Latin or English characters. For example, the English sentence "How are you doing brother?" in Hinglish reads as "Aur bhai kya haal chaal;" the English sentence "Where are you going?" in Hinglish reads as "kahan ja rahe ho;" and the English sentence "What are you doing" in Hinglish reads as "kya kar rahe ho." The character-based CNN engine trains the AI-based model using training datasets of macaronic languages. FIGS. 5B-5E exemplarily illustrate user interfaces 501 displaying word suggestions or predictions generated using an AI-based model trained on text written in Hinglish.

Consider an example where a user starts typing some characters in Hinglish on a user interface 501 of a mobile device, and according to the input, the user clicks on the "Predict" button 502 to obtain suggestions. When the user clicks the "Predict" button 502, the character-based CNN engine deployed in the mobile device activates the trained AI-based model to generate suggestions in Hinglish as exemplarily illustrated in FIGS. 5B-5E. Once the user enters a "space" on the user interface 501, the character-based CNN engine displays the contextualized suggestions or predictions generated by the AI-based model. If the user selects any one of the contextualized suggestions or predictions, the character-based CNN engine displays the next word suggestions. If the user does not select any one of the contextualized suggestions or predictions and starts typing new characters, the character-based CNN engine displays new suggestions based on the current characters being input.

The AI-based model is configured to interpret words that mean the same but are spelt differently, for example, the word "rahe" that is often typed as "rhe," "rahey," etc. The character-based CNN engine allows users to define the rules, thereby allowing entry of any variant of the word. In an embodiment, the character-based CNN engine utilizes word vectors of libraries such as fastText and Approximate Nearest Neighbors Oh Yeah (ANNOY) to manage different types of language structures. The character-based CNN engine clusters words that are similar in Hinglish and can be used interchangeably using the fastText library and ANNOY. The character-based CNN engine utilizes fastText to process subword information, interpret character n-gram information, and learn a vector for the character n-gram, thereby enabling the AI-based model to manage an out-of-vocabulary (OOV) word as the AI-based model can map the subword vector with the nearest existing vectors of a similar word. While training the AI-based model with such subword information-mapped word vectors, the AI-based model understands the structure of a word, tries to develop a pattern, and eventually learns the sentence structure. By using a character-based approach, the character-based CNN engine develops the AI-based model to learn the character patterns and in turn, word patterns. Any context word has its candidate input vector assembled from the combination of both its full-word token and all its character-n-grams. For example, if the context word is "school," and 3-4 characters n-grams are being used, the in-training input vector is a combination of the full-word vector for "school", and all the n-gram vectors for ['sch', 'cho', 'hoo', 'ool', 'scho', 'choo', 'hool']. As a result, those n-grams that are meaningful hint across many similar words. For example, common word-roots or prefixes/suffixes are positioned where they confer that meaning. Other n-grams may remain mostly low-magnitude noise because there is a minimal meaningful pattern to where they appear. After training, the character-based CNN engine constructs reported vectors for individual in-vocabulary words by combining the full-word vector and all n-grams.

When the character-based CNN engine encounters an OOV word to the extent the OOV word shares some or many n-grams with morphologically similar in-training words, the AI-based model generates a similar calculated vector, which provides a better guess to what that word's vector should be. In an embodiment, the character-based CNN engine resolves the introduction of typographical errors when users type shorthand by handling data using a clustered method. For example, the character-based CNN engine resolves the introduction of typographical errors such as "rha" or "rahaa" typed by users in place of a Hindi-English (Hi-En) word "raha" using fastText-based clustering of nearest neighbors. For example, the character-based CNN engine determines the nearest neighbors of "raha" as follows:

[('rha', 0.8431508541107178),
('rahi', 0.7944854497909546),
('rahaa', 0.7476593255996704),
('rhaa', 0.7122218608856201),
('rahe', 0.6921212077140808),
('rhi', 0.688037633895874),
('rahe', 0.6838747262954712), In the above example, the AI-based model is a fastText model trained unsupervised on user chat data for 100 epochs and with a word vector dimension of (1,100). The fastText model was trained using sub-word information and a skip-gram model. After the AI-based model generates the word vectors, clustering of the vectors is performed using ANNOY which uses an angular metric to cluster similar words together. After clustering and selecting an appropriate threshold, words that are semantically similar, for example, [rha, raha, rahaa, rahe, rhi, rahi], are clustered as a variant of the word "raha." The AI-based model is then trained and ready to generate predictions for such words that have variant spellings, rather than the word itself. The AI-based model predicts a cluster and depending on a personalized dictionary of the user being maintained in the mobile device, the AI-based model selects the user's variant and displays the user's variant as a suggestion or prediction on the user interface. The character-based CNN engine, therefore, manages the obscurity of a macaronic language and leaves the obscurity on the mobile device to itself categorize and understand characters entered in a macaronic language.

The AI-based model generated using the character-based CNN architecture disclosed herein outperforms conventional long short-term memory (LSTM)-based models, with a model size of, for example, 1.37 megabyte (MB) and a latency of, for example, 30 milliseconds (ins). For example, during real-time testing of the AI-based model of the present invention and an LSTM-based model deployed on a user device, the AI-based model generated contextualized text with a latency of about 30 ms while the LSTM-based model generated text with a latency of about 80 ms to about 90 ms.

Figure 6A:
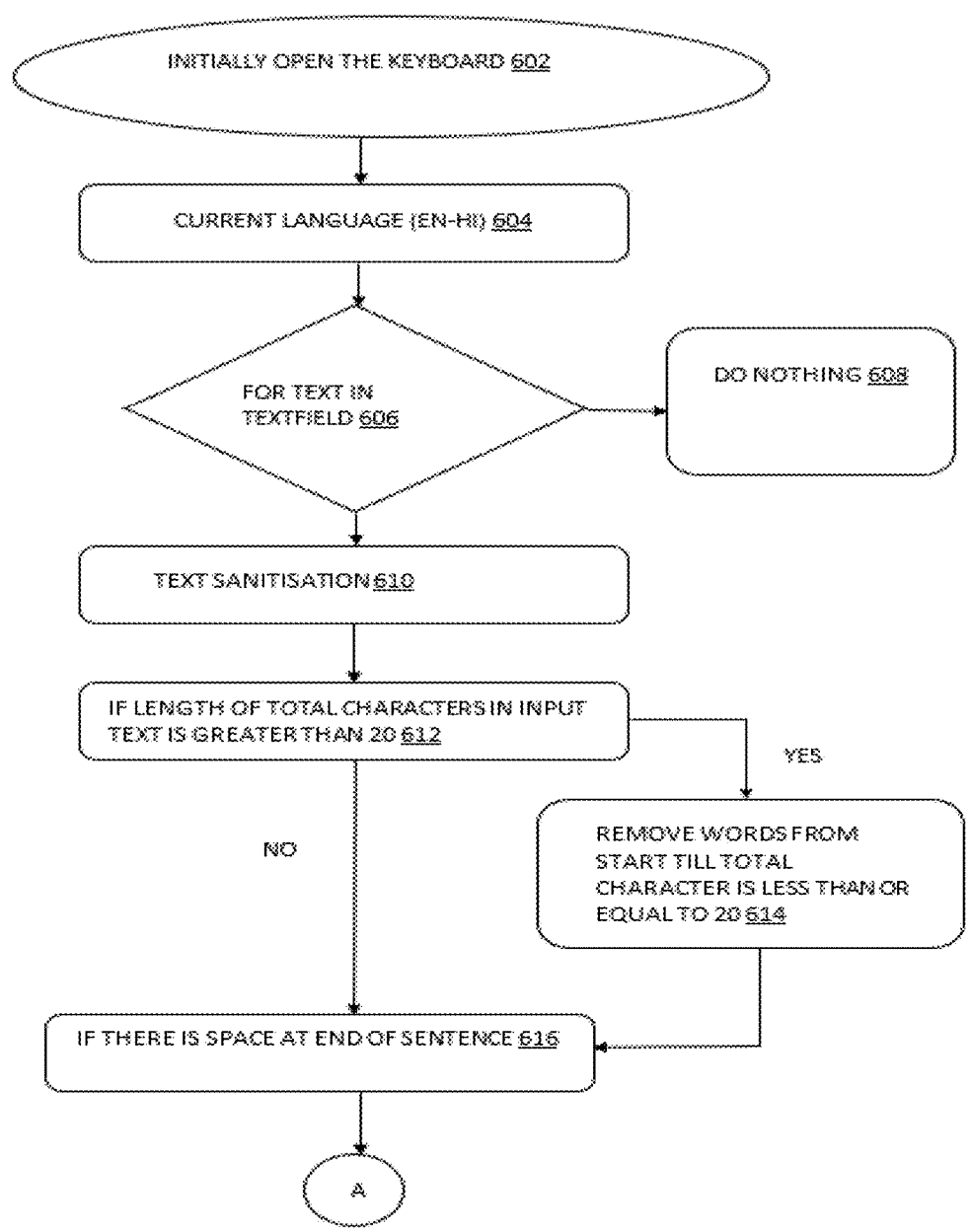
FIG. 6A-6B illustrates the flowchart at the inference stage during the real time usage of the system in accordance with an exemplary scenario.
Figure 6B:
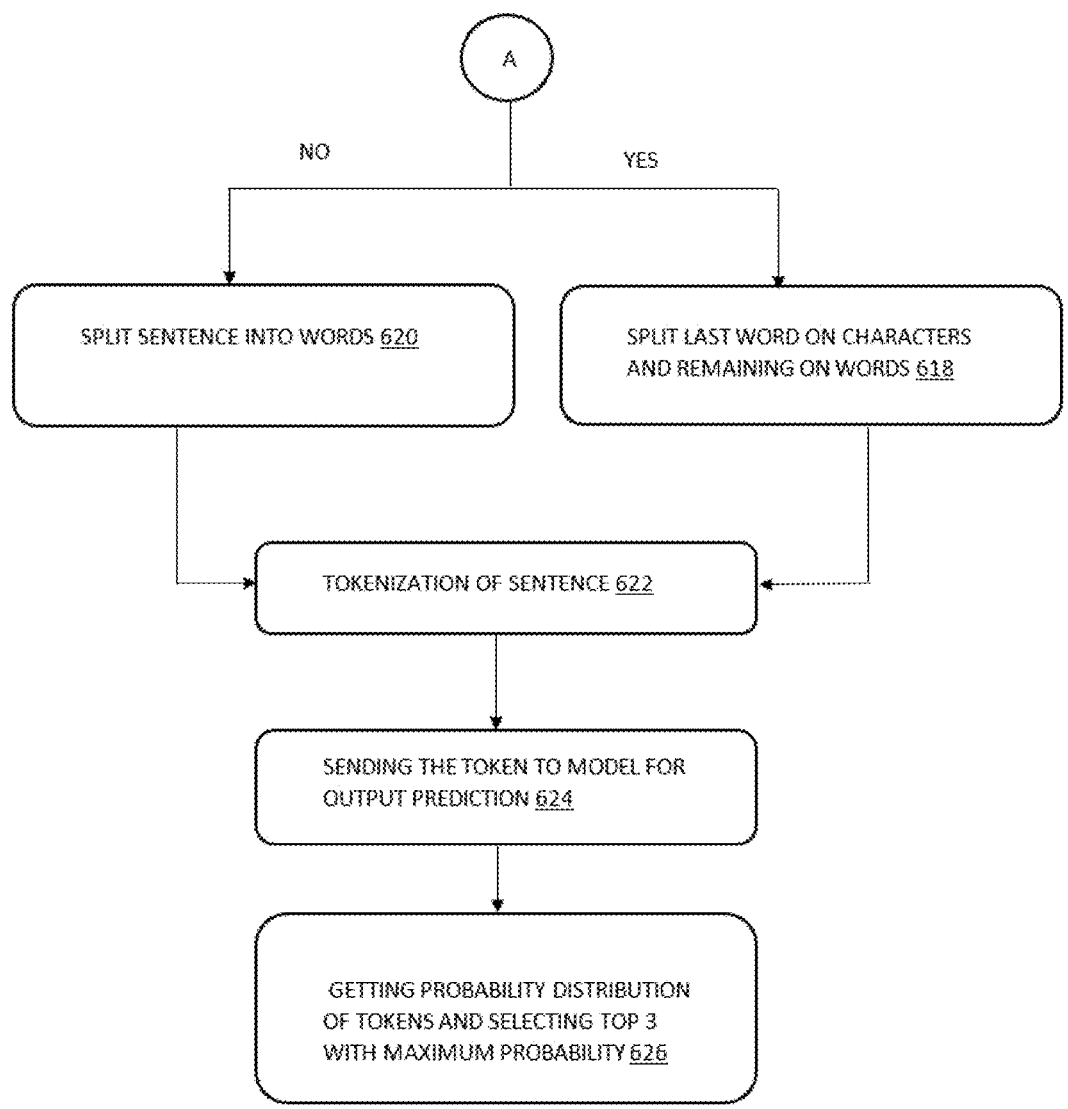

FIG. 6A-6B illustrates the flowchart at an inference stage during a real time usage of the system of the present technology. At step 602, the keyboard is initially opened. At step 604, the current language (en-hi) is provided. At step 606, it is determined whether the text is in the textfield. If the text is not in textfield then at step 608, nothing is going to be performed. In this way, if the text is in textfield then at step 610, text sanitization is performed. At step 612, it is determined whether the length of total characters in the input text is greater than 20. If the length of total characters in the input text is greater than 20 then at step 614, all the words are removed from start till total character is less than or equal to 20, then step 616, is continued. If the length of total characters in the input text is not greater than 20 then at step 616, it is determined if there is space at end of sentence. If there is space then at step 618, the last word is split on characters and remaining on words, then step 622, is continued. If there is no space, then at step 620, the sentence is split into words. At step 622, tokenization of sentence is performed. At step 624, the tokens are sent to model for output prediction. At step 626, the probability distribution of tokens are determined and top 3 with maximum probability is selected.

Figure 7:
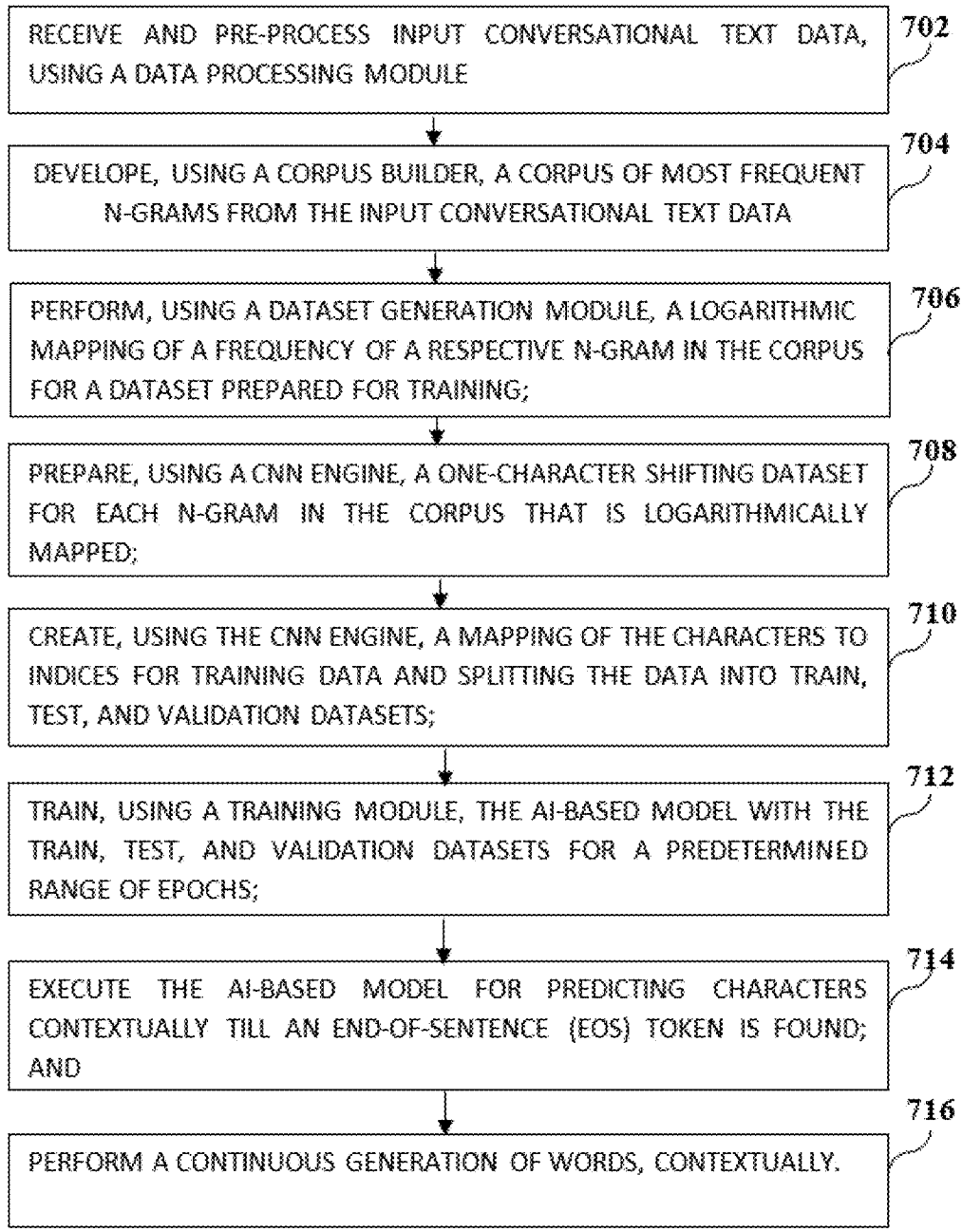
FIG. 7 illustrates a flowchart of a method for generating contextualized text using a character-based convolutional neural network (CNN) architecture, according to an embodiment of the present invention.

FIG. 7 illustrates a flowchart of a method for generating contextualized text using a character-based convolutional neural network (CNN) architecture, according to an embodiment of the present invention. At step 702, the input conversational text data are received and pre-processed using a data processing module. At step 704, a corpus of most frequent n-grams from the input conversational text data are developed, using a corpus builder unit. At step 706, a logarithmic mapping of a frequency of a respective n-gram in the corpus for a dataset prepared for training is performed, using a dataset generation module. At step 708, a one-character shifting dataset for each n-gram in the corpus that is logarithmically mapped is prepared, using a CNN engine. At step 710, a mapping of the characters to indices for training data and splitting the data into train, test, and validation datasets are created, using the character-based CNN engine. At step 712, the AI-based model with the train, test, and validation datasets for a predetermined range of epochs are trained, using a training module. At step 714, the AI-based model for predicting characters are executed contextually till an end-of-sentence (EOS) token is found. At step 716, a continuous generation of words is performed, contextually.

The present invention provides an improved architecture using convolutional neural network (CNN) layers, which is light weighted and is configured to be trained with less resource intensive hardware in less time. The AI-based model developed using the character-based CNN architecture disclosed herein resolves the OOV issue, where the sequence is inputted character wise. The AI-based model is configured to learn the semantic meaning using subword information and benefits from a lightweight dense layer, as the vocabulary is limited to the characters allowed. For example, if only Latin characters and some special characters are allowed, then the size of vocabulary is only 26 letters plus the special characters allowed.

The AI-based model generated using the character-based CNN architecture disclosed herein can be used in a plethora of applications, for example, any type of text generation, summarization, etc. Once the capability of understanding the nuances of a language is completed, the AI-based models of the present invention are used in applications involving any type of textual handling, for example, intent analysis, sentiment analysis, chatbots, generating new article headlines, generating new sentences, paragraphs, or documents, generating a suggested continuation of a sentence, transcribing a speech., creating text captions for a movie or a television show, issuing commands to a radio while driving, etc.

The present invention generates contextualized text using the character-based CNN architecture. The AI-based model developed by the character-based CNN engine using the character-based CNN architecture is capable of generating characters that make words which are contextually related. The character-based CNN architecture disclosed herein is used for natural language generation that has multiple applications, for example, in analytics dashboards, chatbots, content creation, text automation, intelligent text generation, business intelligence interpretation, etc. Numerous business intelligence tool providers are incorporating natural language generation into their tools for report generation based on analytics data. These reports, written in a natural language, allow business leaders and executives to obtain a deeper understanding of the insights discovered by their analytics tools. Although these tools are proficient at generating reports in easily comprehensible formats, these tools cannot work by directly deriving insights from unstructured data. These systems need to be fed data using structured databases, which means that the process of natural language generation may not be entirely autonomous and hence, not fully intelligent.

Natural language generation also helps businesses automate the processes that require the creation of information in natural languages. An example is a content creation AI tool that is capable of writing as naturally as humans by building on short, manually provided writing prompts. Such systems, while not capable of accurately replicating human ways of expression, are configured to generate long and coherent sequences of sentences. Considering the difficulty in getting machines to create natural language content, such cases represent a huge leap in the field of AI research. The present invention can be applied in natural language generation for writing meeting memos, press releases, legal documents, case studies, financial reports, weather reports, product descriptions, and handling of complex customer communication. The present invention reduces human involvement and allows deployment of resources efficiently. The present invention can also be applied in natural language generation for inventory management and implementation as a comprehensive business intelligence (BI) reporting and analysis tool by guiding future decisions. Natural language generation also helps businesses automate the processes that require the creation of information in natural languages. An example is a content creation AI tool that is capable of writing as naturally as humans by building on short, manually provided writing prompts. Such systems, while not capable of accurately replicating human ways of expression, are configured to generate long and coherent sequences of sentences. Considering the difficulty in getting machines to create natural language content, such cases represent a huge leap in the field of AI research. The present invention can be applied in natural language generation for writing meeting memos, press releases, legal documents, case studies, financial reports, weather reports, product descriptions, and handling of complex customer communication. The present invention reduces human involvement and allows deployment of resources efficiently. The present invention can also be applied in natural language generation for inventory management and implementation as a comprehensive.

The foregoing examples and illustrative implementations of various embodiments have been provided merely for explanation and are in no way to be construed as limiting the present invention. While the present invention has been described with reference to various embodiments, illustrative implementations, drawings, and techniques, it is understood that the words, which have been used herein, are words of description and illustration, rather than words of limitation. Furthermore, although the present invention has been described herein with reference to particular means, materials, embodiments, techniques, and implementations, the present invention is not intended to be limited to the particulars disclosed herein; rather, the present invention extends to all functionally equivalent structures, methods and uses, such as are within the scope of the appended claims. It will be understood by those skilled in the art, having the benefit of the teachings of this specification, that the present invention is capable of modifications and other embodiments may be effected and changes may be made thereto, without departing from the scope and spirit of the present invention.

What is claimed is:

1. A system for generating a contextualized text using a character-based convolutional neural network (CNN) engine, the system comprising:
 a memory comprising the character-based CNN engine comprising one or more executable modules; and
 a processor configured to execute the character-based CNN engine and the one or more executable modules for generating the contextualized text using the character-based CNN engine, the one or more executable modules comprising:
 a data processing module for receiving and pre-processing an input conversational text data;
 a corpus builder unit for developing a corpus of most frequent n-grams from the input conversational text data;
 a dataset generation module for performing logarithmic mapping of a frequency of a respective n-gram in the corpus for preparing a one-character shifting dataset;
 preparing, using the character-based CNN engine, the one-character shifting dataset for each n-gram in the corpus that is logarithmically mapped;
 creating, using the character-based CNN engine, a mapping of characters to indices for training data and splitting the training data into train, test, and validation datasets;
 a training module for training an artificial intelligence (AI)-based model with the train, test, and validation datasets for a predetermined range of epochs;
 receiving a sequence of characters from a user via a user interface;
 a prediction module for executing the trained AI-based model on the sequence of characters for predicting characters contextually till an end-of-sentence (EOS) token is found; and
 performing a continuous generation of words from the sequence of characters, contextually;
 wherein the character-based CNN engine trains the AI-based model for generating characters that make contextually related words.

2. The system of claim 1, wherein the training module is further configured to train the AI-based model using languages comprising well-defined vocabulary, grammar rules, and sentence structure rules.

3. The system of claim 1, wherein the AI-based model is a character-based model that receives the sequence of characters instead of words to overcome out-of-vocabulary errors, learns semantic meaning using sub-word information, and generates contextualized text.

4. The system of claim 1, wherein the AI-based model is further configured to interpret words that mean the same but are spelt differently.

5. The system of claim 1, wherein the predicting module is further configured for:
 receiving the input of characters from the user via the user interface;
 sending the input characters to the AI-based model to generate and display suggestions on the user interface;
 determining, whether any of the suggestions is selected by the user; and
 displaying; suggestions or predictions till the EOS token is encountered-found.

6. The system of claim 5, wherein for determining whether any of the suggestions is selected, the character-based CNN engine further performs:
 determining if the user selects one of the suggestions;
 displaying a subsequent contextualized word predictions generated by the AI-based model, upon the user selecting one of the suggestions; and
 displaying new suggestions generated by the AI-based model to the user based on one or more new characters input by the user, upon the user not selecting one of the suggestions.

7. The system of claim 1, wherein the character-based CNN engine comprises a number of configurable convolutional layers, and wherein the layers are an input embedding layer, a batch normalization layer, a first convolutional layer and a parametric rectified linear unit (PReLU) layer.

8. The system of claim 1, the system comprises a hybrid model architecture that ingests a character and outputs a word, and wherein the hybrid model architecture supports complete typing solutions by providing contextualized predictions, suggestions, and auto-corrections.

9. A method for generating a contextualized text using a character-based convolutional neural network (CNN) engine, the method comprising:
 receiving, and pre-processing an input conversational text data, using a data processing module;
 developing, using a corpus builder unit, a corpus of most frequent n-grams from the input conversational text data;
 performing, using a dataset generation module, a logarithmic mapping of a frequency of a respective n-gram in the corpus for preparing a one-character shifting dataset;
 preparing, using a the character-based CNN engine, a one-character shifting dataset for each n-gram in the corpus that is logarithmically mapped;
 creating, using the character-based CNN engine, a mapping of characters to indices for training data and splitting the training data into train, test, and validation datasets;
 training, using a training module, an AI-model with the train, test, and validation datasets for a predetermined range of epochs;
 receiving a sequence of characters from a user via a user interface;
 executing the trained AI-based model on the sequence of characters for predicting characters contextually till an end-of-sentence (EOS) token is found; and
 performing a continuous generation of words from the sequence of characters, contextually;
 wherein the character-based CNN engine trains the AI-based model for generating characters that make contextually related words.

10. The method of claim 9, wherein the character-based CNN engine trains the AI-based model using languages that have no well-defined vocabulary, grammar rules, and sentence structure rules.

11. The method of claim 9, wherein the AI-based model is a character-based model and is configured to receive the sequence of characters instead of words to overcome out-of-vocabulary errors, learn semantic meaning using sub-word information, and generate the contextualized text.

12. The method of claim 9, further comprising interpreting words that mean the same but are spelt differently by the AI-based model.

13. The method of claim 9, wherein the predicting further comprises:
 receiving the input of characters from the user via the user interface;

sending, by the character-based CNN engine, the input of characters to the AI-based model to generate and display suggestions on the user interface;

determining, by the character-based CNN engine, whether any of the suggestions is selected by the user; and displaying, by the character-based CNN engine, suggestions or predictions till the EOS token is found.

14. The method of claim 3, wherein for determining whether any of the suggestions is selected, comprises:

determining if the user selects one of the suggestions;

displaying a subsequent contextualized word predictions generated by the AI-based model, upon the user selecting one of the suggestions; and displaying new suggestions generated by the AI-based model to the user based on one or more new characters input by the user, upon the user not selecting one of the suggestions.

15. The method of claim 9, wherein the character-based CNN engine comprises a number of configurable convolutional layers, and wherein the layers are an input embedding layer, a batch normalization layer, a first convolutional layer and a parametric rectified linear unit (PReLU) layer.

16. The method of claim 9, further comprises ingesting, by a hybrid model architecture, a character and outputting a word, and wherein the hybrid model architecture supports complete typing solutions by providing contextualized predictions, suggestions, and auto-corrections.

* * * * *